(12) United States Patent
Haahr et al.

(10) Patent No.: US 11,326,575 B2
(45) Date of Patent: May 10, 2022

(54) WIND TURBINE BLADE MANUFACTURE

(71) Applicant: Vestas Wind Systems A/S, Aarhus N. (DK)

(72) Inventors: Arne Haahr, Ringkøbing (DK); Andrew Hedges, Surbiton (GB); Morten Taulbjerg, Holstebro (DK)

(73) Assignee: Vestas Wind Systems A/S, Aarhus N (DK)

( * ) Notice: Subject to any disclaimer, the term of this patent is extended or adjusted under 35 U.S.C. 154(b) by 483 days.

(21) Appl. No.: 16/498,078

(22) PCT Filed: Apr. 4, 2018

(86) PCT No.: PCT/DK2018/050061
§ 371 (c)(1),
(2) Date: Sep. 26, 2019

(87) PCT Pub. No.: WO2018/184643
PCT Pub. Date: Oct. 11, 2018

(65) Prior Publication Data
US 2021/0115892 A1     Apr. 22, 2021

(30) Foreign Application Priority Data

Apr. 5, 2017     (DK) ............................ PA 2017 70246

(51) Int. Cl.
*F03D 1/06*     (2006.01)
*B29C 65/48*     (2006.01)
(Continued)

(52) U.S. Cl.
CPC ............ *F03D 1/0675* (2013.01); *B29C 65/48* (2013.01); *B29C 65/7826* (2013.01);
(Continued)

(58) Field of Classification Search
CPC ......... F03D 1/06; F03D 1/0675; B29C 64/48; B29C 64/7826; B29C 66/54;
(Continued)

(56) References Cited

U.S. PATENT DOCUMENTS

2011/0008175 A1     1/2011  Gau
2016/0195060 A1 *   7/2016  Akhtar .................... F03D 80/50
                                                        29/889.7
(Continued)

FOREIGN PATENT DOCUMENTS

CN          101260861 A      9/2008
CN          106715092 A      5/2017
(Continued)

OTHER PUBLICATIONS

European Patent Office, International Search Report and Written Opinion in PCT Application No. PCT/DK2018/050061, dated Jun. 5, 2018.

(Continued)

*Primary Examiner* — Juan G Flores
*Assistant Examiner* — Joshua R Beebe
(74) *Attorney, Agent, or Firm* — Wood Herron & Evans LLP

(57) ABSTRACT

A wind turbine blade and associated method of manufacture is described. The blade comprises an outer shell formed of first and second half shells joined together. A shear web is arranged inside the outer shell. The shear web has a web panel disposed between first and second longitudinally-extending mounting flanges. The shear web is bonded to inner surfaces of the respective half shells via a first adhesive bond line between the first mounting flange and the inner surface of the first half shell and a second adhesive bond line between the second mounting flange and the inner surface of the second half shell. One or more bond spacers are provided (Continued)

in the second bond line, and optionally in the first bond line. The bond spacers are compressed between a shear web mounting flange and an inner surface of a half shell and are plastically deformed. The method of making the shear web involves compressing and the one or bond spacers in the bond line(s) such that they undergo plastic deformation. This results in high quality bond lines.

18 Claims, 13 Drawing Sheets

(51) Int. Cl.
    *B29C 65/78*     (2006.01)
    *B29C 65/00*     (2006.01)
    *B29K 307/04*     (2006.01)
    *B29K 309/08*     (2006.01)
    *B29L 31/08*     (2006.01)

(52) U.S. Cl.
    CPC ............ *B29C 66/54* (2013.01); *B29C 66/721* (2013.01); *B29K 2307/04* (2013.01); *B29K 2309/08* (2013.01); *B29L 2031/085* (2013.01); *F05B 2230/20* (2013.01)

(58) Field of Classification Search
    CPC .............. B29C 66/721; B29K 2307/04; B29K 2309/08; B18L 2031/085; F05B 2230/20
    See application file for complete search history.

(56) References Cited

U.S. PATENT DOCUMENTS

| | | | |
|---|---|---|---|
| 2017/0050372 A1* | 2/2017 | Nielsen | ................ F03D 1/0675 |
| 2017/0058867 A1 | 3/2017 | Yarbrough et al. | |
| 2018/0156190 A1* | 6/2018 | Johnson | ................ F03D 1/0675 |

FOREIGN PATENT DOCUMENTS

| | | | | | |
|---|---|---|---|---|---|
| CN | 109641400 | A | | 4/2019 | |
| CN | 110603139 | A | | 12/2019 | |
| GB | 2488099 | A | | 8/2012 | |
| GB | 2529186 | A | | 2/2016 | |
| GB | 2535697 | A | * | 8/2016 | ............ B29C 65/48 |
| GB | 2535697 | A | | 8/2016 | |
| JP | 2008030470 | A | | 2/2008 | |
| WO | 2015165967 | A1 | | 11/2015 | |
| WO | 2017016566 | A1 | | 2/2017 | |
| WO | 2017220596 | A1 | | 12/2017 | |

OTHER PUBLICATIONS

Danish Patent and Trademark Office, Search and Examination Report in PA 2017 70246, dated Sep. 20, 2017.

China National Intellectual Property Administration, First Notification of Office Action in CN Application No. 201880029499.5, dated Feb. 22, 2021.

* cited by examiner

WIND TURBINE BLADE MANUFACTURE

TECHNICAL FIELD

The present invention relates generally to wind turbine blades, and more specifically to methods of making wind turbine blades and apparatus for use in such methods.

BACKGROUND

Modern wind turbine blades typically comprise a hollow shell made up of two half-shells bonded together along leading and trailing edges of the shells. One or more longitudinally-extending shear webs are provided within the internal cavity of the blade. A shear web comprises a web panel disposed between upper and lower mounting flanges. The mounting flanges are bonded respectively to opposed inner surfaces of the two half-shells.

The method of making the blade typically involves forming the two half shells separately from composite materials in respective half-moulds of a blade mould assembly. With the half-shells supported in their respective half moulds, the shear web is then bonded between respective inner surfaces of the half shells, and the half shells are bonded together.

The process of bonding the various parts together typically involves depositing a line of adhesive on the inner surface of a first half shell. The shear web is then lifted into the first half shell and positioned with its lower mounting flange on top of the adhesive. Further adhesive is applied to the upper mounting flange of the shear web, and along leading and trailing edges of the first half shell. The second mould half is then lifted, turned and positioned on top of the first mould half. This is referred to as 'closing the mould'. The weight of the second half shell and second mould half bears down on the shear web and the first half shell. This causes the adhesive to compress between the various parts. Once the adhesive is cured, the completed blade may be removed from the mould.

Typically the parts are joined together in a two-stage join-up process. The first stage of the join-up involves bonding the shear web to the first half shell whilst the mould is open. A jig may be used to support the shear web during this stage. Use of a jig allows consistent and high quality bond lines to be achieved between the shear web and the first half shell. Once the adhesive between the first half shell and the shear web has cured, the jig is removed and the mould is then closed to bond the shear web to the second half shell and to bond the first and second half shells together in the second stage of the two-stage join-up.

A disadvantage of the two-stage join-up is that it can be time consuming. This is because it takes some time for the adhesive to cure in the first stage before the second stage can commence. In order to increase the rate of production of wind turbine blades, a one-stage join-up may be considered, in which the shear web is bonded simultaneously to the first and second half shells. However, a one-stage join up introduces additional challenges to the manufacturing process because the bond lines on each side of the shear web must be created with the mould closed. This makes it impossible to use a jig to support the shear web. It can therefore be challenging to achieve high quality and consistent bond lines between the shear web and the half shells.

In both a one-stage and a two-stage join-up, when the second mould half is positioned on top of the first mould half, the second half shell tends to release partially or fully from the second mould half (under the action of gravity), resulting in one or more gaps between the second half shell and its mould half. This can make it difficult to control the bonding process, and may lead to uneven compression of the adhesive on one or both sides of the shear web. In addition, when heat is applied to cure the adhesive, thermal expansion may cause the second half shell to move back towards the mould half, which may then cause dis-bonds in the bond lines.

It is an object of the present invention to provide an improved process for joining the various parts of a blade together, which avoids some or all of the problems described above.

SUMMARY OF THE INVENTION

According to a first aspect of the present invention, there is provided a method of making a wind turbine blade having an outer shell formed of first and second half shells, the method comprising: providing a first half shell supported by a first mould half; providing a second half shell supported by a second mould half; providing a shear web having a web panel disposed between first and second longitudinally-extending mounting flanges; providing adhesive between the first mounting flange and an inner surface of the first half shell to form a first bond line; providing adhesive between the second mounting flange and an inner surface of the second half shell to form a second bond line; providing one or more bond spacers between the second mounting flange and the inner surface of the second half shell; arranging the second mould half and the second half shell respectively on top of the first mould half and the first half shell to join the first and second half shells together, wherein the weight of the second half shell and the second mould half acts on the shear web and causes compression of the adhesive in the second bond line and plastic deformation of the one or more bond spacers.

The method may comprise arranging one or more further bond spacers between the first mounting flange and the inner surface of the first half shell. The weight of the second half shell and the second mould half acting on the shear web may cause compression of the adhesive in the first bond line and plastic deformation of the one or more further bond spacers.

The method may comprise forming the first and second bond lines simultaneously and at the same time as joining the first and second half shells together. The method may comprise curing the adhesive in the first and second bond lines simultaneously. Accordingly, the bond spacers may be used in a one-stage join-up process.

The method may comprise arranging a first plurality of bond spacers between the first mounting flange and the first half shell. The method may further comprise arranging a second plurality of bond spacers between the second mounting flange and the second half shell.

The method may comprise simultaneously compressing the first and second plurality of bond spacers to substantially equal extents such that the first and second bond lines are of substantially equal thickness.

The method may comprise forming the first bond line prior to forming the second bond line and prior to joining the first and second half shells together. The method may comprise curing the adhesive in the first bond line prior to arranging the second mould half and the second half shell on top of the first mould half and the first half shell. Accordingly, the bond spacers may be used in a two-stage join-up process.

According to a second aspect of the present invention, there is provided a wind turbine blade comprising: an outer shell formed of first and second half shells joined together;

a shear web arranged inside the outer shell, the shear web having a web panel disposed between first and second longitudinally-extending mounting flanges; a first adhesive bond line between the first mounting flange and an inner surface of the first half shell; a second adhesive bond line between the second mounting flange and an inner surface of the second half shell; and one or more plastically deformed bond spacers located in the second bond line.

The wind turbine blade may further comprise one or more plastically deformed bond spacers located in the first bond line.

The one or more bond spacers may comprise blocks, for example blocks of foam. Preferably the one or more bond spacers are made from closed-cell polyethylene terephthalate (PET).

The wind turbine blade may comprise a plurality of plastically deformed bond spacers arranged at spaced intervals along the first and/or second bond line.

The one or more bond spacers may be compressed between a mounting flange of the shear web and the inner surface of a half shell.

The one or more bond spacers may comprise a first plurality of bond spacers provided in the first bond line. The one or more bond spacers may include a second plurality of bond spacers provided in the second bond line. The first and second plurality of bond spacers may be compressed to substantially equal extents such that the thickness of the first and second bond lines is substantially equal. Accordingly, the shear web may be substantially central between the first and second half shells.

Optional features described above or claimed in relation to the first aspect of the invention apply equally to the second aspect of the invention and vice versa. Repetition of such features is avoided purely for reasons of conciseness.

BRIEF DESCRIPTION OF THE DRAWINGS

The invention will now be described by way of non-limiting example with reference to the accompanying figures, in which.

DETAILED DESCRIPTION

Figure 1:
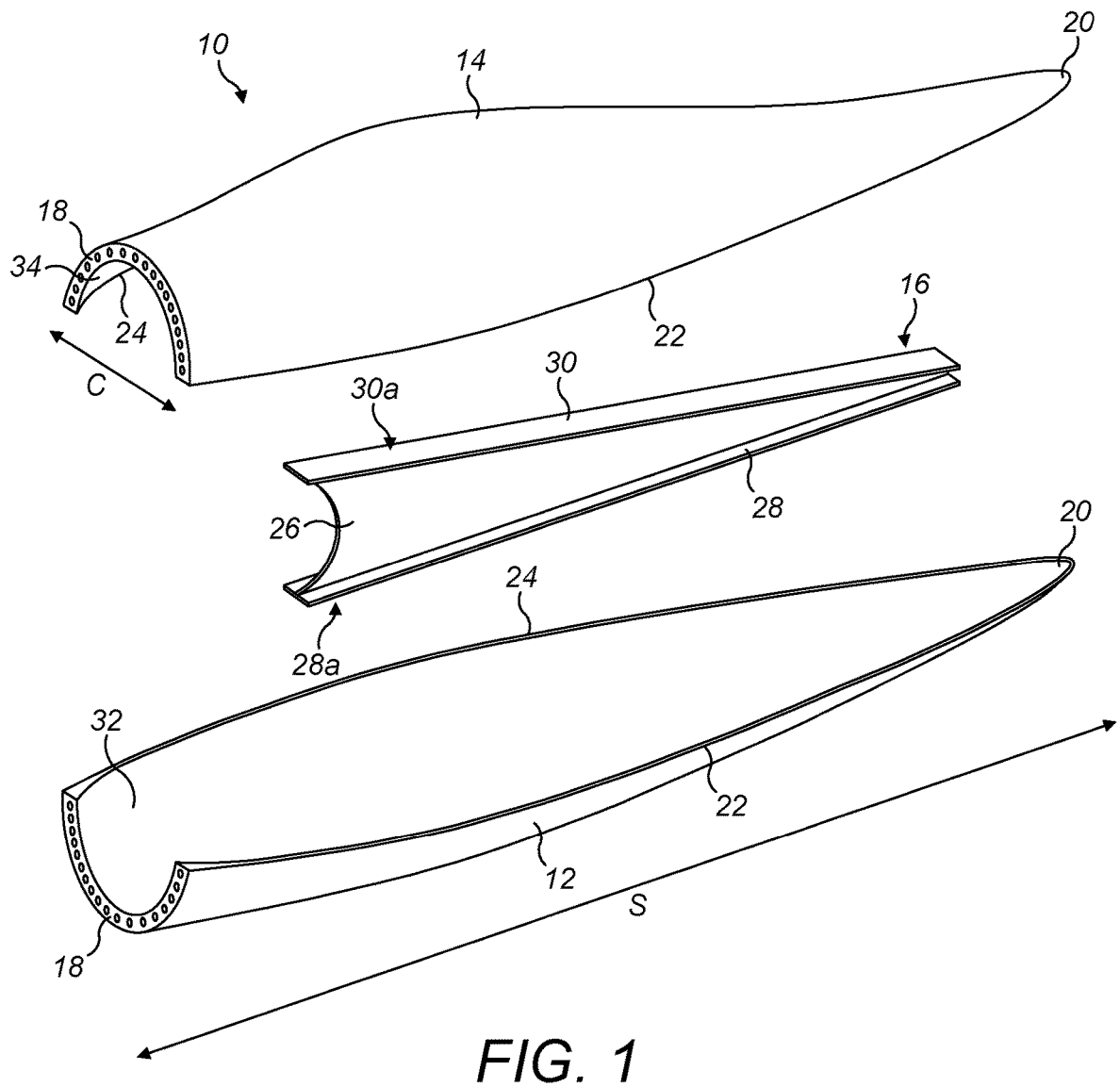
FIG. 1 is an exploded view of a wind turbine blade comprising first and second half shells and a shear web.

FIG. 1 is an exploded view of a wind turbine blade 10. The blade 10 comprises an outer shell formed of first and second half shells 12, 14, e.g. a windward half shell and a leeward half shell, and a single shear web 16. The half shells 12, 14 each extend from a root end 18 to a tip end 20 in a spanwise direction, S, and extend between a leading edge 22 and a trailing edge 24 in a chordwise direction, C.

The shear web 16 is a longitudinally-extending structure, which in the illustrated example comprises a web panel 26 disposed between first and second mounting flanges 28, 30. In the orientation of the shear web 16 shown in the figures, the first mounting flange 28 is a 'lower' mounting flange, and the second mounting flange 30 is an 'upper' mounting flange. The mounting flanges 28, 30 are arranged transversely to the web-panel 26 and each flange 28, 30 has an outer 'mounting' surface 28a, 30a for bonding to an inner surface 32, 34 of a respective half shell 12, 14.

In this example, the shear web 16 is substantially I-shaped in cross-section. In other embodiments, the shear web 16 may have a different shape, e.g. C-shaped. Also, in this example, the shear web 16 tapers in height progressively moving from a root end to a tip end, corresponding to the tapering thickness of the blade 10 towards the tip 20.

The various parts of the blade 10 are typically made from composite materials, for example glass-fibre reinforced plastic (GFRP) and/or carbon-fibre reinforced plastic (CFRP). The blade shells 12, 14 are formed in separate half moulds of a blade mould assembly, whilst the shear web is generally formed in a dedicated shear web mould tool. Once the various parts have been formed, they are then joined together in a join-up process to form the completed blade 10. This typically involves bonding the first and second half shells 12, 14 together with the shear web 16 inside the blade 10 bonded to the respective inner surfaces 32, 34 of the half shells 12, 14.

As discussed by way of background, a one-stage or a two-stage join-up process may be used to bond the shear web 16 to the respective half shells 12, 14. In the one-stage join-up, the shear web 16 is bonded simultaneously to the first and second half shells 12, 14, whilst in the two-stage join-up the shear web 16 is first bonded to the first half shell 12 in a first stage, and then to the second half shell 14 in a second stage.

Prior to discussing the present invention, a basic one-stage join-up process will be discussed in more detail with reference to FIGS. 2 to 5.

Figure 2:
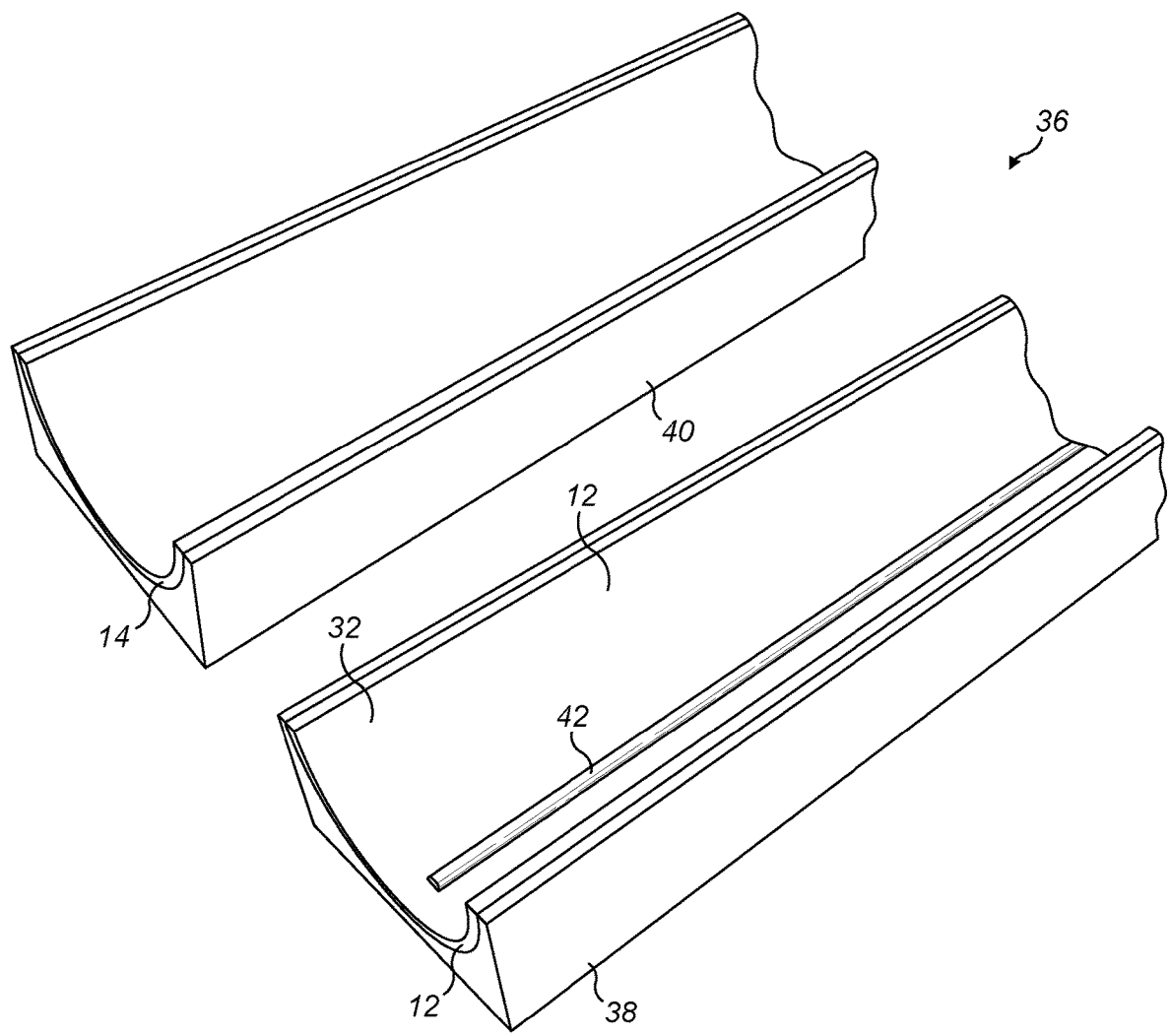
FIG. 2 shows the first and second half shells supported in respective first and second mould halves and a line of adhesive deposited on an inner surface of the first half shell.

Referring to FIG. 2, this shows a blade mould assembly 36 comprising a pair of side-by-side mould halves, i.e. a first mould half 38 and a second mould half 40. As shown, the mould halves 38, 40 have already been used to form the two halves of the blade shell. Accordingly, the first mould half 38 is shown supporting a first half shell 12, whilst the second mould half 40 is supporting a second half shell 14.

Prior to the join-up, a bead of adhesive 42 is deposited on an inner surface 32 of one of the half shells 12. As shown in FIG. 2, in this example a bead of adhesive 42 is deposited on the inner surface 32 of the first half shell 12. The adhesive will be used to bond the shear web 16 (shown in FIG. 1) to the first half shell 12. The adhesive may be deposited in a straight line, which extends along a majority of the length of the blade shell 12. The length of the adhesive bead 42 corresponds generally to the length of the shear web 16.

Figure 3:
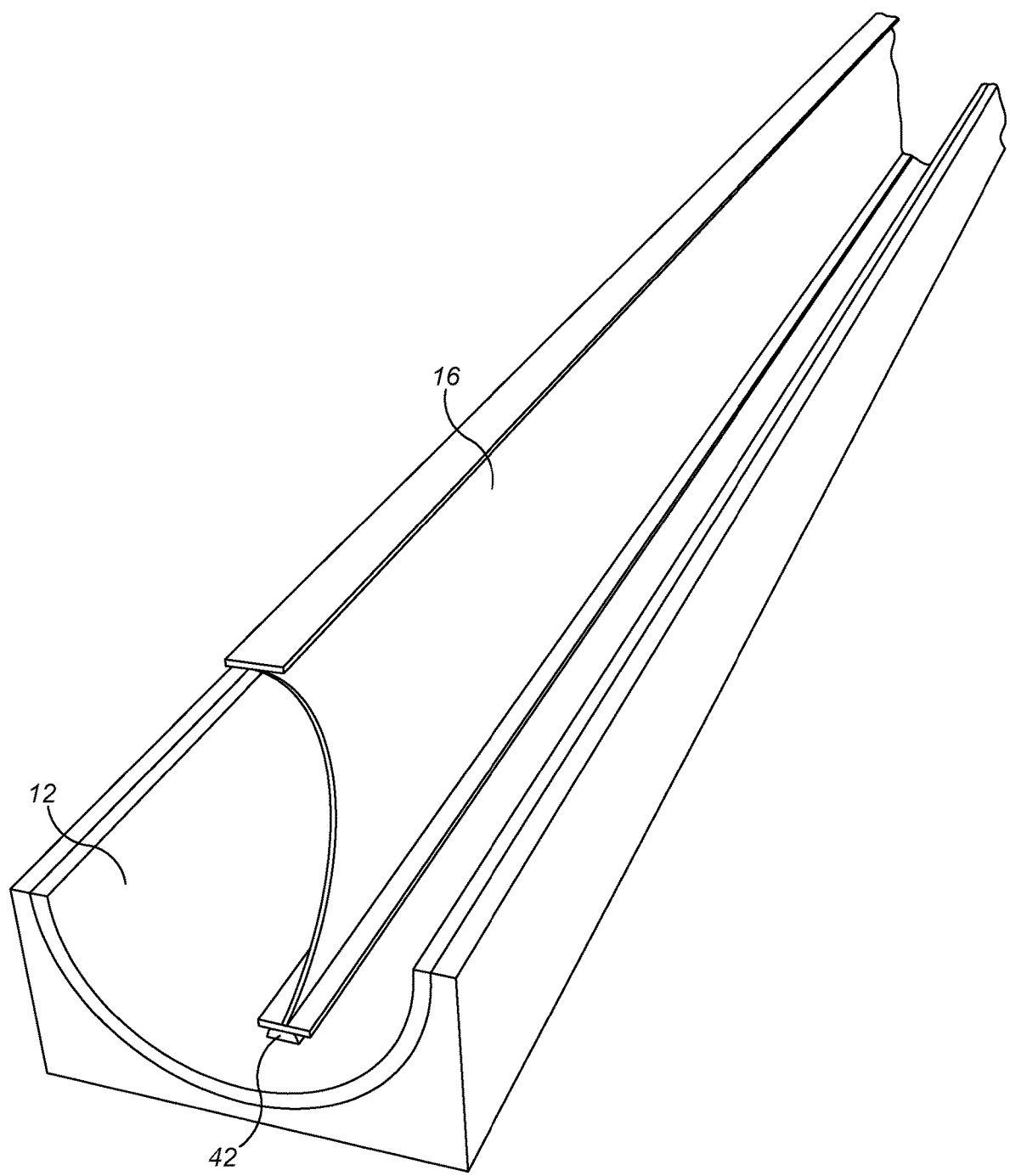
FIG. 3 shows the shear web positioned in the first half shell on top of the line of adhesive shown in FIG. 2.

Referring to FIG. 3, the shear web 16 is positioned on top of the adhesive 42 deposited in the previous stage. In this example, the shear web 16 is lifted into the first half shell 12 and positioned with its lower mounting flange on top of the bead of adhesive 42.

Figure 4:
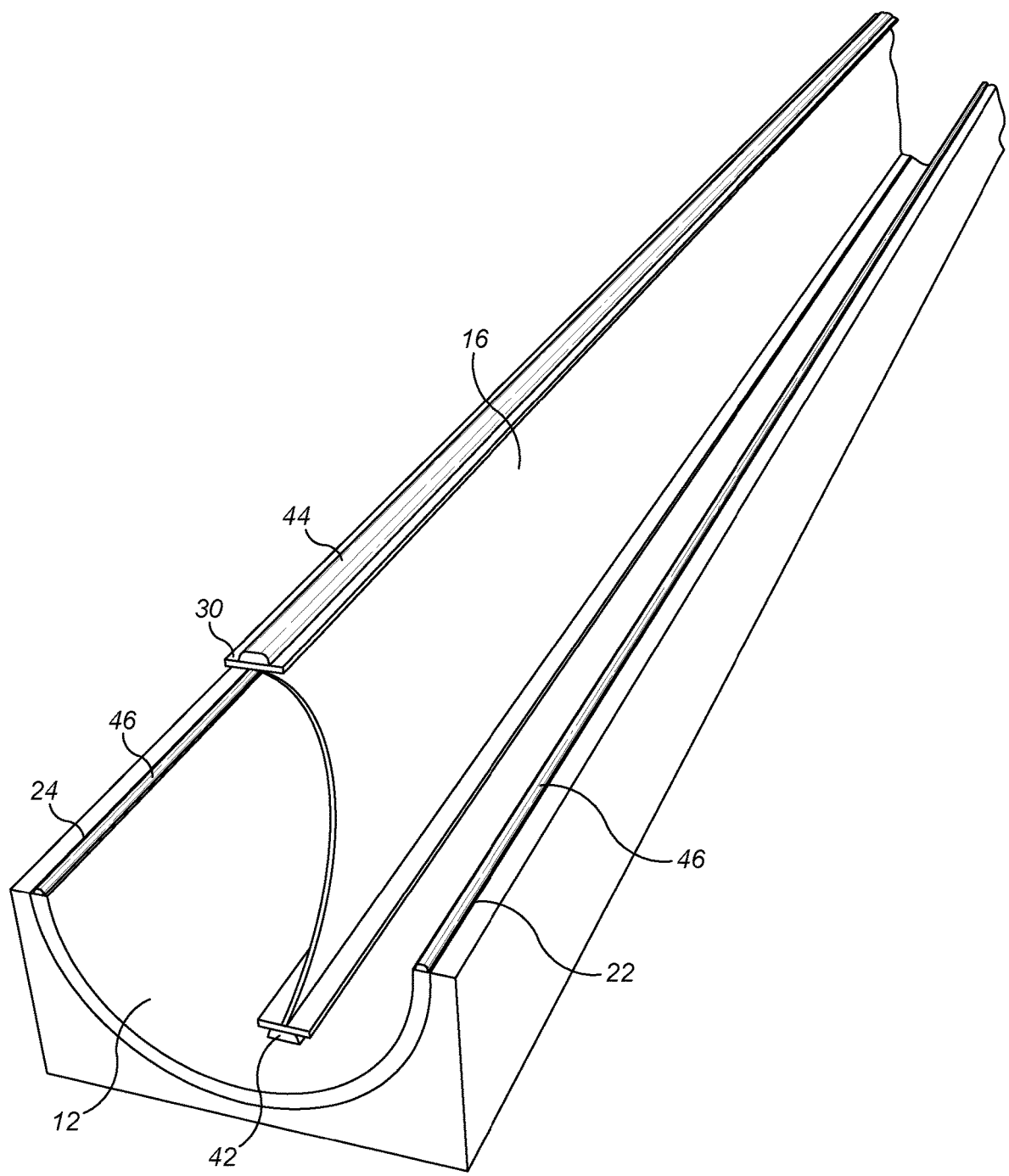
FIG. 4 shows further adhesive applied to an upper mounting flange of the shear web and to leading and trailing edges of the first half shell.

Referring to FIG. 4, a bead of adhesive 44 is applied to the upper mounting flange 30 of the shear web 16 and further adhesive 46 is applied along the leading and trailing edges 22, 24 of the first half shell 12. As shown in FIG. 4, the adhesive 42 is partially compressed under the weight of the shear web 16.

Figure 5:
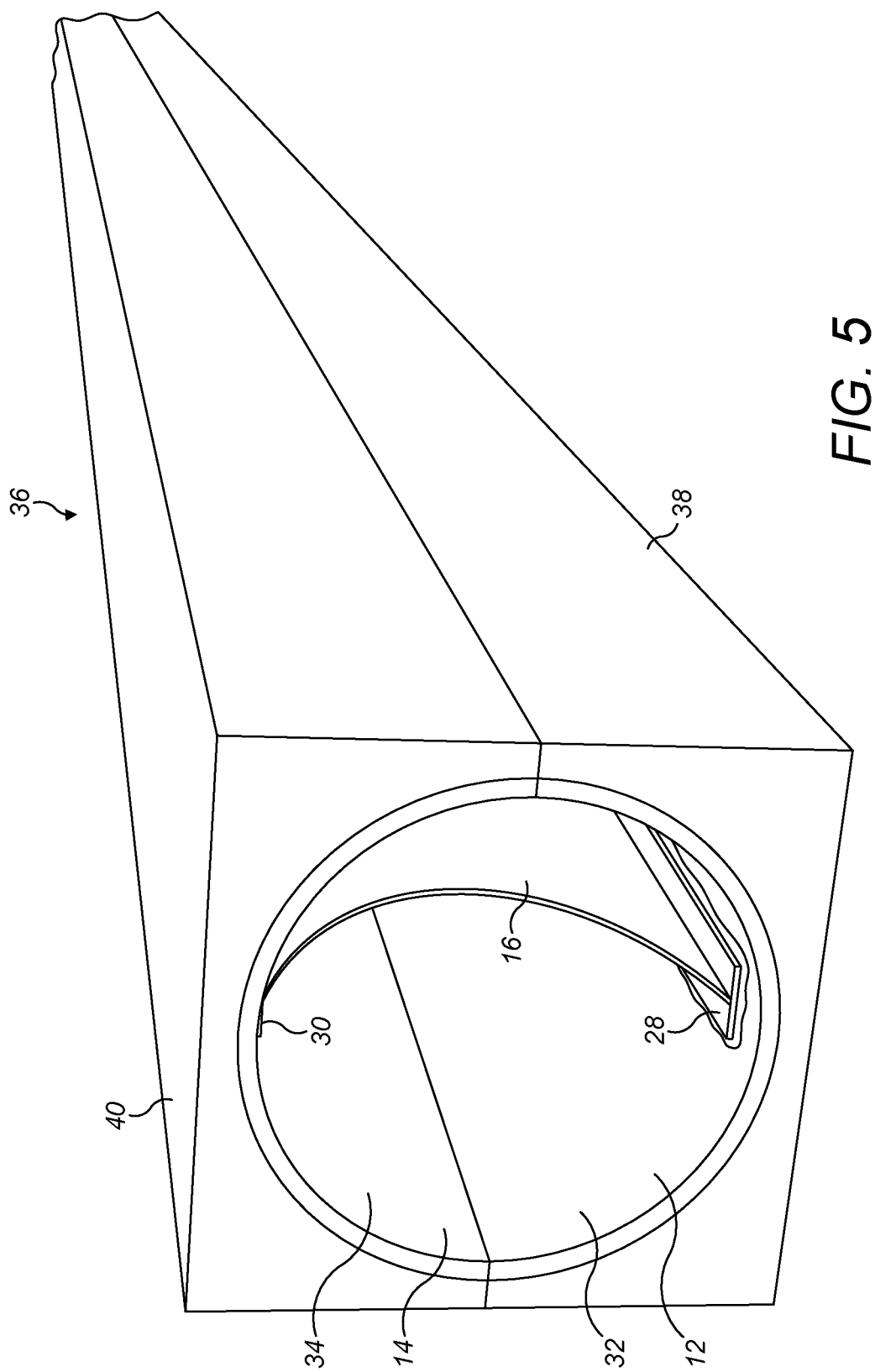
FIG. 5 shows the second mould half and second half shell positioned on top of the first mould half and first half shell in order to join the various parts of the blade together.

Referring additionally to FIG. 5, the join-up process involves bonding the various parts together, i.e. bonding the two half shells 12, 14 together, and bonding the shear web 16 between the two half shells 12, 14. In this example, the process involves positioning the second half shell 14 on top of the first half shell 12. This is achieved by lifting and turning the second mould half 40 and placing it on top of the first mould half 38—this process is referred to as 'closing the mould'.

With the mould 36 closed, the adhesive 42, 44, 46 (shown in FIG. 4) between the various components is compressed under the weight of the second half shell 14 and second mould half 40. Specifically, the adhesive 42 deposited on the first half shell 12 is squeezed between the inner surface 32 of the first half shell 12 and the lower mounting flange 28 of the shear web 16 to create a first or 'lower' bond line 48 (shown in FIG. 6); the adhesive 44 applied to the upper mounting flange 30 of the shear web 16 is squeezed between the inner surface 34 of the second half shell 14 and the upper mounting flange 30 of the shear web 16 to create a second or 'upper' bond line 50 (shown in FIG. 6); and the adhesive 46 applied to the leading and trailing edges of the first half shell 12 is squeezed against the corresponding leading and trailing edges of the second half shell 14.

Figure 6:
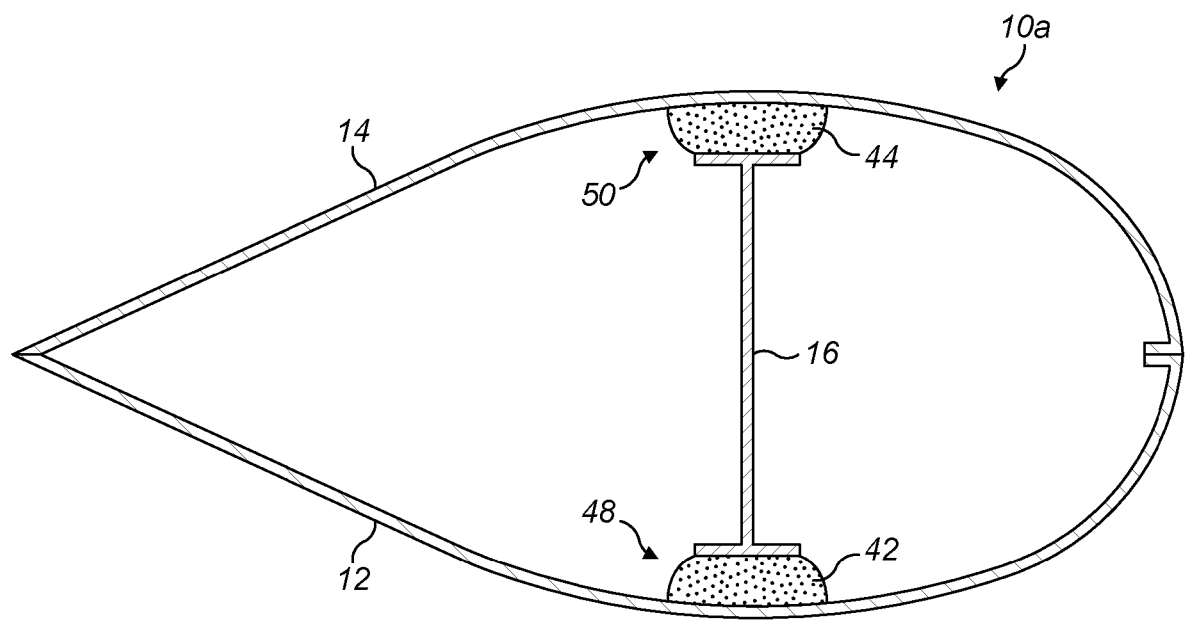
FIG. 6 is a cross-sectional view of a wind turbine blade showing ideal bonding between the shear web and the half shells, in which upper and lower bond lines have equal thickness.

FIG. 6 is a schematic cross-section through a wind turbine blade 10a, and shows ideal bonding between the shear web 16 and the blade shells 12, 14, in which the adhesive 42, 44 in the lower and upper bond lines 48, 50 of the shear web 16 is equally compressed. Accordingly, the lower and upper bond lines 48, 50 are of substantially equal thickness. The shear web 16 is therefore located centrally between the two half shells 12, 14.

In practice, it can be difficult to achieve even compression of the adhesive 42, 44 on both sides of the shear web 16 (e.g. above and below the shear web 16 as shown in the figures) during the join-up. One problem is that the upper half shell 14 tends to release partially from the upper mould half 40 (shown in FIG. 5) during the join up. The released part of the upper half shell 14 may cause uneven compression of the adhesive 42, 44, for example localised over-compression of the adhesive 42, 44 below and/or above the shear web 16. This may result in parts of the bond lines 48, 50 below and above the shear web 16 having unequal thicknesses.

Figure 7:
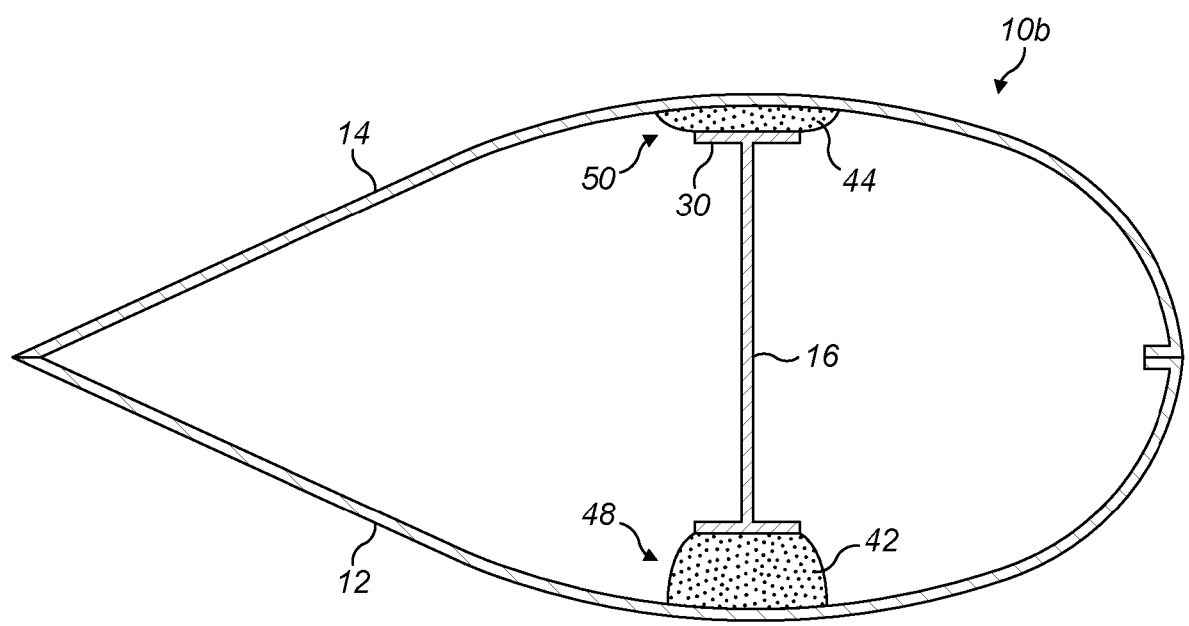
FIG. 7 is a cross-sectional view of a wind turbine blade showing sub-optimal bonding, in which adhesive in the upper bond line is over compressed whilst adhesive in the lower bond line is under compressed.

Referring to FIG. 7, for example, this shows the situation where the adhesive 44 on the upper mould flange 30 of the shear web 16 is over-compressed. Over-compression of the adhesive 44 above the shear web 16 may in-turn result in under-compression of the adhesive 42 below the shear web, as shown in FIG. 7. The upper bond line 50 is then thinner than the lower bond line 48, and the shear web 16 is not located centrally between the two half shells 12, 14 but is instead closer to the second half shell 14 than to the first half shell 12.

Figure 8:
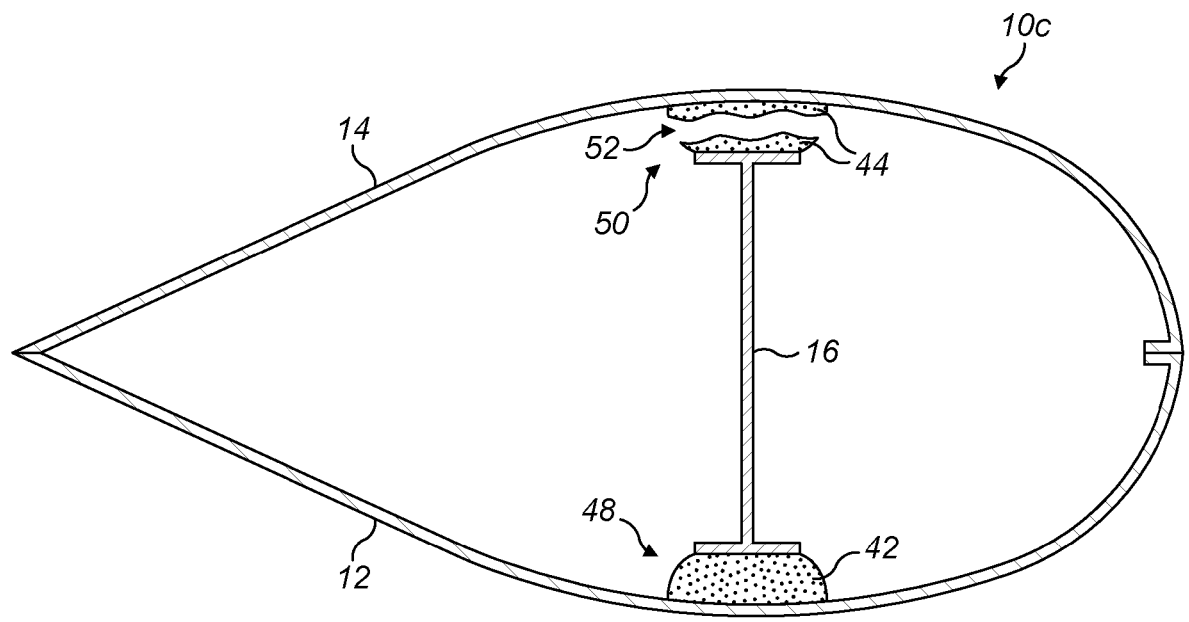
FIG. 8 is a cross-sectional view of a wind turbine blade showing a dis-bond in the upper bond line.

Also, as discussed by way of background, dis-bonds may be caused by lifting of the upper half shell 14 during curing of the adhesive 42, 44. In particular, if the upper half shell 14 releases from the upper mould half 40 (shown in FIG. 5) during the join-up process, a gap may remain between the upper half shell 14 and the upper half mould 40. When heat is applied to cure the adhesive 42, 44, thermal expansion of the upper half shell 14 may cause it to lift back up towards the upper mould half 40 causing a dis-bond in the upper bond line 50. A dis-bond 52 in the upper bond line 50 is shown by way of example in FIG. 8.

The present invention addresses these problems by providing bond spacers in the bond lines 48, 50 between the shear web 16 and the half shells 12, 14, as will now be described with reference to the remaining figures.

Figure 9:
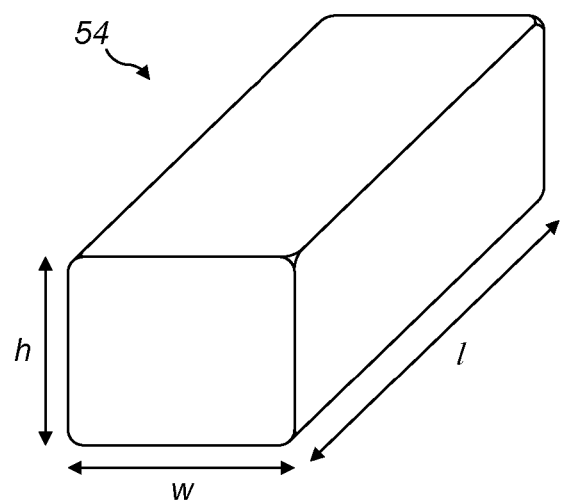
FIG. 9 shows a bond spacer for inclusion in the bond lines between the shear web and the half shells in accordance with embodiments of the present invention.

Referring to FIG. 9, this is a perspective view showing an example of a bond spacer 54 according to an embodiment of the present invention. The bond spacer 54 in this example comprises a block made of compressible material. In this example, the bond spacer 54 is made from foam. The bond spacer 54 may have any suitable dimensions, but in this example the block has a lengthwise dimension (I) of approximately 60 mm, a widthwise dimension (w) of approximately 15 mm, and a height dimension (h) (also referred to as 'thickness') of approximately 12 mm.

Preferably the height/thickness (h) of the bond spacers 54 is greater than the thickness of cured adhesive 42, 44 (see FIG. 6) required in the bond lines 48, 50 between the shear web 16 and the blade shells 12, 14. In this way, the bond spacers 54 prevent over compression of the adhesive 42, 44. As described in more detail later, the bond spacers 54 are designed to undergo plastic deformation when they are subjected to loads above a predetermined amount.

In an example, the bond spacer 54 is made from closed-cell polyethylene terephthalate (PET) material. In this example, this has a compression modulus of 60 MPa and a compression strength of 1.5 MPa. When the bond spacers 54 are subjected to a compressive load they will undergo elastic deformation until a yield point is reached, after which the material will experience plastic deformation and any change in shape of the bond spacers 54 will be irreversible. At the yield point, the yield strength of the material in this example is 1.2 MPa. The yield strength is defined using the offset yield strength method at 0.2% strain.

Figure 10:
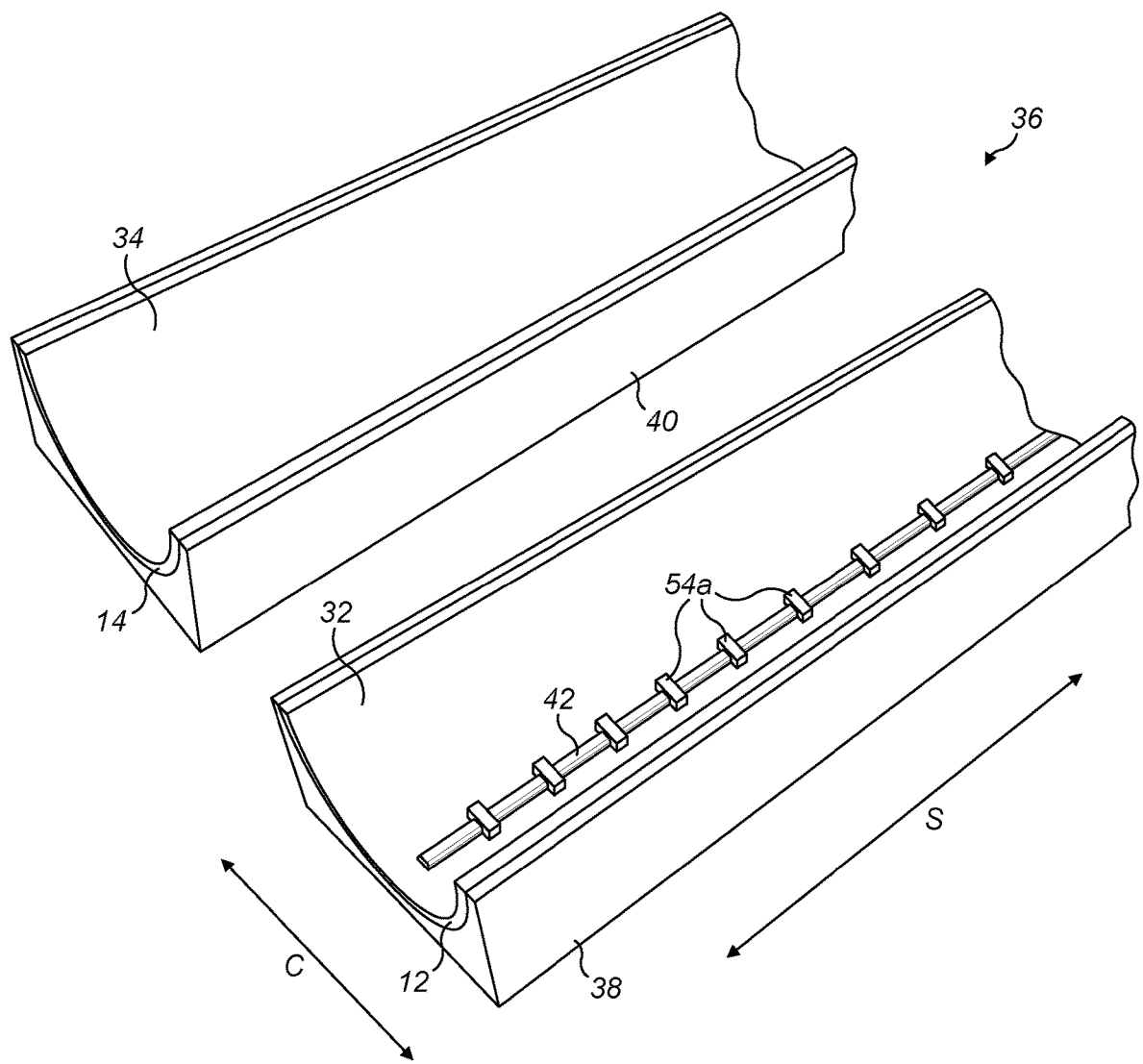
FIG. 10 shows first and second half shells supported in respective first and second mould halves and a line of adhesive deposited on an inner surface of the first half shell, with a first plurality of bond spacers positioned in the adhesive.

Referring to FIG. 10, this figure corresponds to FIG. 2 but additionally shows a first plurality of 'lower' bond spacers 54a positioned in the line of adhesive 42 applied to the inner surface 32 of the first half shell 12. The bond spacers 54a correspond to the bond spacer shown schematically in FIG. 9. The bond spacers 54a are mutually spaced apart in the longitudinal or spanwise direction S. Preferably, the bond spacers 54a are spaced at regular longitudinal intervals along the line of adhesive 42. In this example, the bond spacers 54a are arranged approximately every one metre, although other suitable spacing may be used. In this example, the bond spacers 54a are oriented with their lengthwise dimension (I) substantially parallel to the chordwise direction C of the half shell 12, and their widthwise dimension (w) substantially parallel to the longitudinal direction S of the half shell 12.

The bond spacers 54a may be positioned in the adhesive 42 by hand, for example, after the adhesive 42 has been deposited. Alternatively, the bond spacers 54a may be prepositioned, for example bonded to the inner surface 32 of the first half shell 12, and the line of adhesive 42 may be deposited on top of the bond spacers 54a. As a further alternative, the bond spacers 54a may be attached to the lower mounting flange 28 of the shear web 16 (shown in FIG. 1).

The bond spacers 54 are positioned in the adhesive 42, and therefore they interrupt the line of adhesive 42 at intervals. The widthwise dimension (w) of the bond spacers 54a cannot be so large that it would have a detrimental effect on the strength of the adhesive bond line.

Figure 11:
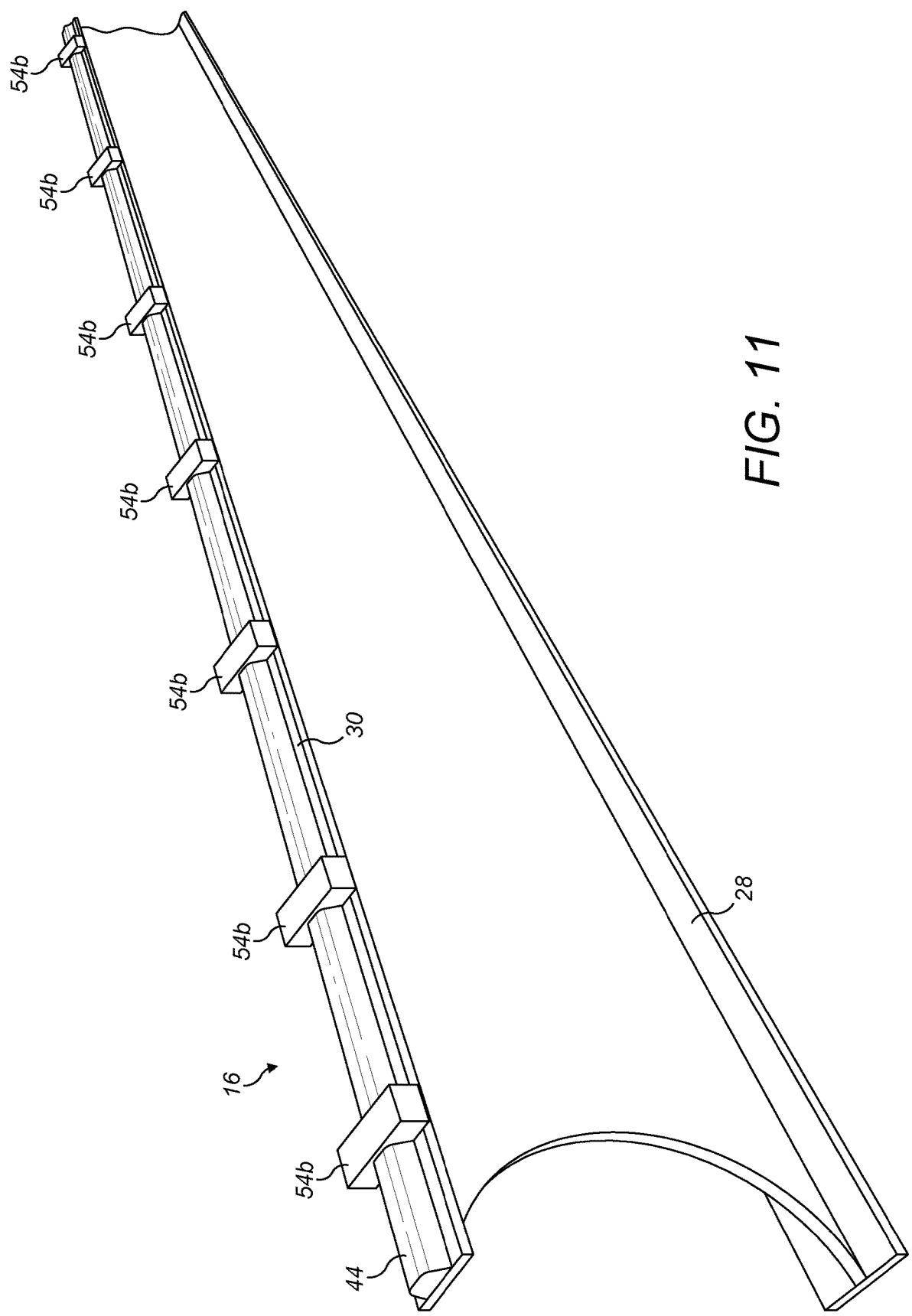
FIG. 11 shows part of a shear web with a line of adhesive and a second plurality of bond spacers positioned on an upper mounting flange of the shear web.

Referring to FIG. 11, this shows part of the shear web 16 in isolation. Adhesive 44 has been applied to the upper mounting flange 30 of the shear web 16, and a second plurality of 'upper' bond spacers 54b have been inserted into the adhesive 44. The second bond spacers 54b are identical to the first bond spacers 54a in this example. The bond spacers 54b are mutually spaced apart. Preferably, the bond spacers 54b are spaced at regular intervals along the upper mounting flange 30. In this example, the bond spacers 54b are arranged approximately every one metres, although other suitable spacing may be used. In this example, the bond spacers 54b are oriented with their lengthwise dimension (l) substantially parallel to the width of the upper mounting flange 30, and their widthwise dimension (w) substantially parallel to the length of the upper mounting flange 30.

The bond spacers 54b may be positioned in the adhesive 44 by hand, for example, after the adhesive 44 has been applied to the upper mounting flange 30. Alternatively, the bond spacers 54b may be prepositioned, for example bonded to the upper mounting flange 30, and the line of adhesive 44 may be deposited on top. As a further alternative, the upper bond spacers 54b may be attached to the inner surface 34 of the second half shell 14.

Preferably the bond spacers are positioned such that the lower and upper bond spacers 54a, 54b are mutually aligned.

In the same way as previously described with reference to FIGS. 4 and 5, with the bond spacers 54a, 54b in place, the shear web 16 is lifted into the first half shell 12 and positioned on top of the adhesive 42 and first bond spacers 54a in the first half shell 12. The mould 36 is then closed to bond the first and second half shells 12, 14 together and to bond the shear web 16 to the inner surfaces 32, 34 of the respective half shells 12, 14. The bond spacers 54a, 54b maintain a substantially fixed spacing between the shear web mounting flanges 28, 30 and the half shells 12, 14 during the join-up and are designed to undergo plastic deformation when subjected to sufficient load, as will be discussed in further detail below.

The function of the bond spacers 54a, 54b during a one-stage join-up process will now be described in more detail with reference to FIGS. 12a-12d.

Figure 12A:
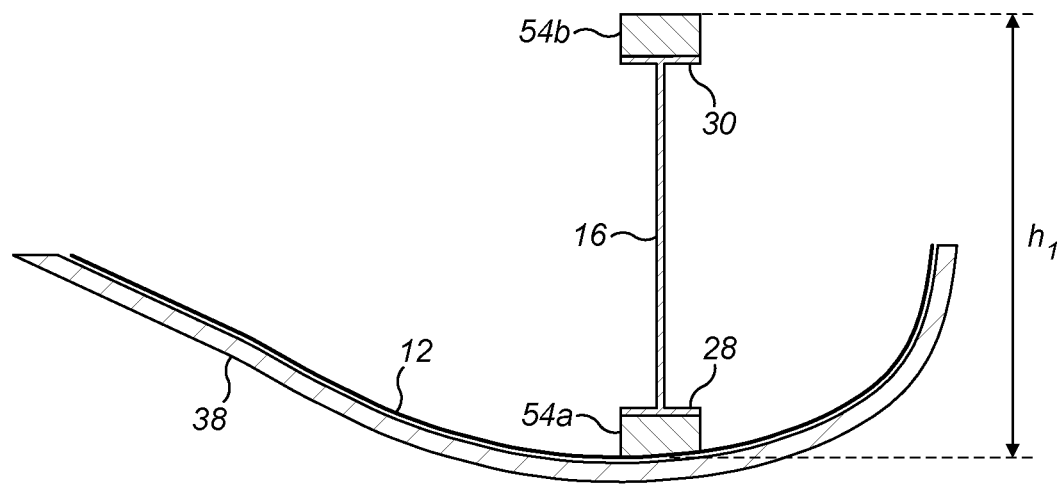
FIGS. 12a-12d are schematic cross-sectional views through a blade and mould assembly showing the function of the bond spacers during a one-stage blade join-up process.

Referring to FIG. 12a, this is a schematic cross-sectional view of the first or 'lower' mould half 38 supporting the first or 'lower' half shell 12. The shear web 16 is arranged in the first half shell 12 and is shown supported on top of the first 'lower' bond spacers 54a. As discussed above in relation to FIG. 11, second 'upper' bond spacers 54b are provided on the upper mounting flange 30 of the shear web 16. The mass of the shear web 16 is lower than the yield strength of the lower bond spacers 54a. Accordingly, no plastic deformation of the lower bond spacers 54a occurs at this stage.

Figure 12B:
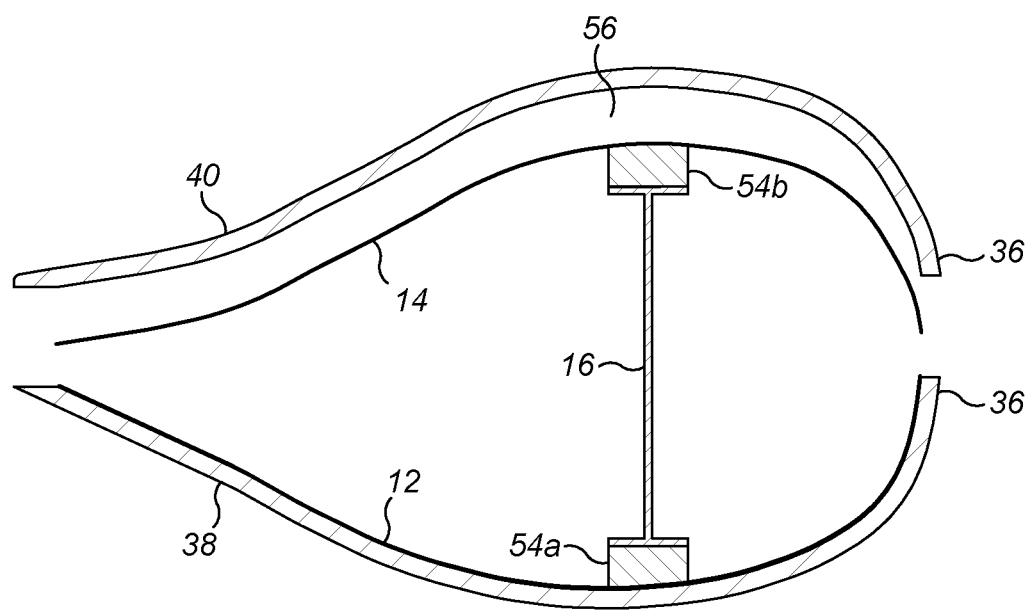

Referring to FIG. 12b, the mould assembly 36 is closed by lowering the second or 'upper' mould half 40 onto the lower mould half 38. As shown in FIG. 12b, the second or 'upper' half shell 14 may release from the upper half mould 40 when the mould 40 is turned upside down, resulting in a gap 56 between the upper half shell 14 and the upper mould half 40, as shown. It should be noted that the gap 56 is not to scale and would be smaller in reality.

The released half shell 14 is supported by the upper bond spacers 54b. The mass of the upper shell 14 is less than the yield strength of the upper bond spacers 54b and the upper bond spacers 54b hold the shell 14 up until the upper mould 40 makes contact with the shell 14 again. The bond spacers 54a, 54b are thicker than the thickness of cured adhesive 42, 44 (shown in FIG. 6) required in the bond lines 48, 50 (also shown in FIG. 6), which prevents the adhesive 42, 44 from becoming over compressed when the upper half shell 14 releases from the upper mould half 40.

Figure 12C:
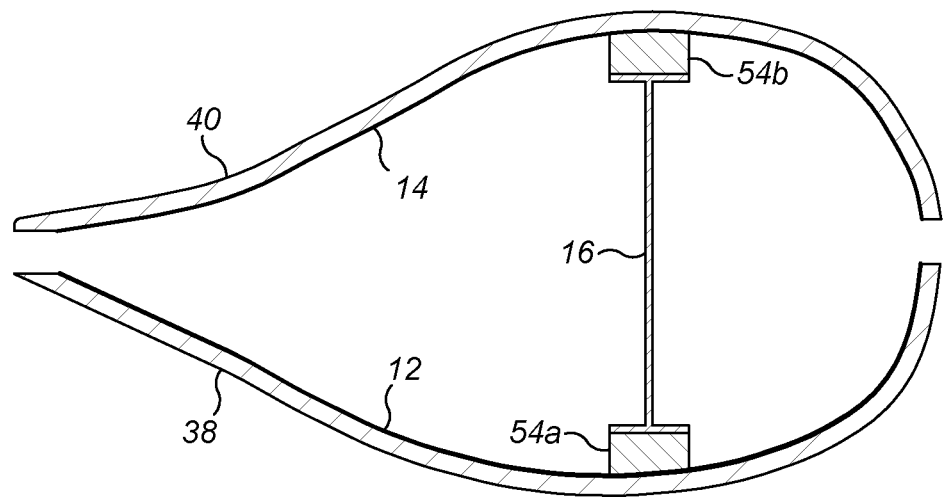

Referring to FIG. 12c, the upper mould half 40 is lowered further and makes contact again with the upper half shell 14. The upper bond spacers 54b force the upper half shell 14 back into the upper mould half 40 before substantial compression of the adhesive 42, 44 (see FIG. 6) takes place. The mass of the mould 40 now also acts on the bond spacers 54a, 54b. The combined load of the upper mould half 40 and the upper half shell 14 acting on the bond spacers 54a, 54b exceeds the yield strength of the bond spacers 54a, 54b. The bond spacers 54a, 54b therefore begin to undergo plastic deformation. As the bond spacers 54a, 54b push the upper shell 14 firmly into its mould 40, the adhesive 42, 44 (see FIG. 6) is compressed evenly along the length of the shear web 16.

Figure 12D:
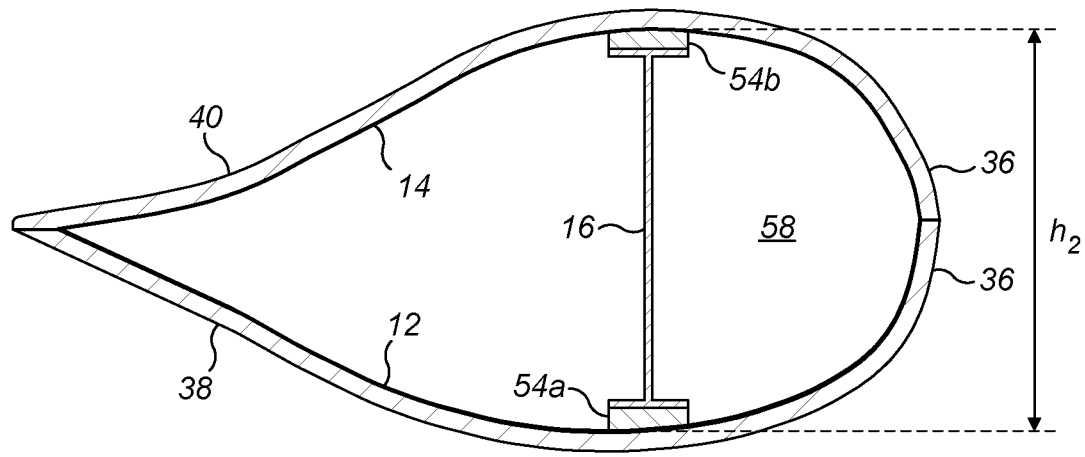

Referring to FIG. 12d, the upper mould 40 is lowered further to bring the first and second half shells 12, 14 together. The bond spacers 54a, 54b continue to compress until end stops on the mould 36 are reached. With the upper half shell 14 firmly pushed up into the upper half mould 40, the compressive stress on the upper and lower bond spacers 54a, 54b is the same. It also follows that the compression of the adhesive 42, 44 in the bond lines 48, 50 (shown in FIG. 6) above and below the shear web 16 is equal. This results in the shear web 16 being centralised between the lower and upper half shells 12, 14.

The thickness of the compressed adhesive 42, 44 in the lower and upper bond lines 48, 50 is therefore also equal, resulting in ideal bonding between the shear web 16 and both blade shells 12, 14, as discussed above in relation to FIG. 6. Heat may now be applied to cure the adhesive 42, 44. With the upper half shell 14 pushed firmly into the upper mould half 40, gaps between the upper half shell 14 and the upper half mould 40 are substantially eliminated and hence the upper half shell 14 cannot lift up and cause a dis-bond during the curing process.

It will be appreciated from FIGS. 12a-12d that the combined height ($h_1$) of the shear web 16 and bond spacers 54a, 54b prior to closing the mould 36 (see FIG. 12a) is greater than the height ($h_2$) of the internal cavity 58 defined between the inner surfaces 32, 34 of the first and second half shells 12, 14 in the completed blade (see FIG. 12d). The bond spacers 54a, 54b compress under the weight of the second half shell 14 and second half mould 40 and undergo plastic deformation (as shown in FIG. 12d) such that the combined height of the shear web 16 and the compressed bond spacers 54a, 54b is equal to the height ($h_2$) of the internal cavity 58 in the finished blade.

The use of bond spacers 54a, 54b presents a number of advantages when used in a one-stage join up. In summary, the bond spacers 54a, 54b ensure that the second half shell 14 is pushed firmly into the second half mould 40 before substantial compression of the adhesive 42, 44 takes place. This avoids gaps 56 (see FIG. 12b) between the shell 14 and mould 40 during the cure process, and thus prevents the possibility of the upper half shell 14 lifting and causing a dis-bond. More generally, the bond spacers 54a, 54b serve to prevent movement between the shell 12, 14 and the web 16 during the bonding process. With the second half shell 14 firmly seated in its mould 40, even compression of the adhesive 42, 44 is achieved along the length of the shear web 16. This avoids over compression of adhesive 42, 44, which could also cause dis-bonds. Furthermore, when used in a one-stage join up, the bond spacers 54a, 54b serve to centralise the shear web 16 between the first and second half shells 12, 14, resulting in substantially equal compression of adhesive 42, 44 on both sides of the shear web 16, and hence bond lines 48, 50 of substantially equal thickness.

Bond spacers can also be utilised during a two-stage join-up, as will now be described with reference to FIGS. 13a-13d. FIGS. 13a-13d correspond to FIGS. 12a-12d, however it will be recalled that in a two-stage join-up the shear web 16 is bonded to the first half shell 12 before being bonded to the second half shell 14.

Figure 13A:
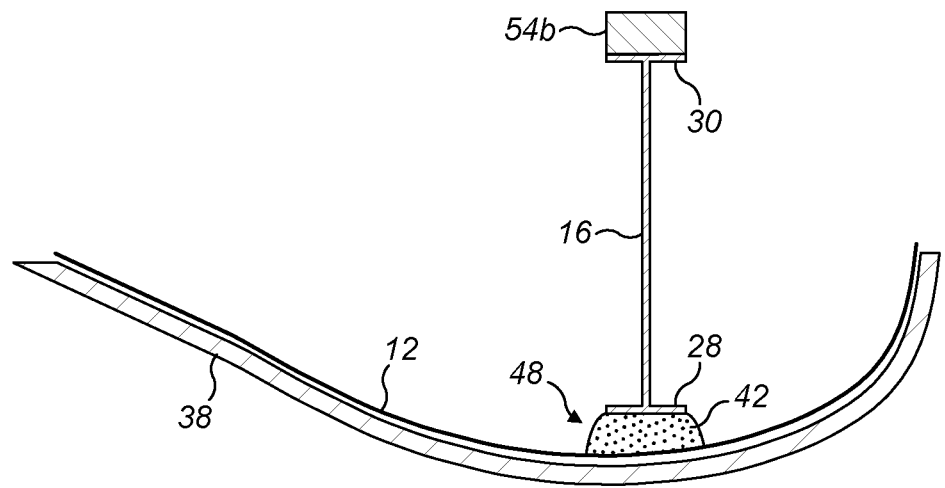
FIGS. 13a-13d are schematic cross-sectional views through a blade and mould assembly showing the function of bond spacers during a two-stage blade join-up process.

Referring to FIG. 13a, this shows the shear web 16 already bonded to the lower half shell 12 by means of adhesive 42 according to a first stage of the two-stage join up process. In this example, lower bond spacers are not used in the lower bond line 48. However, in other examples, lower bond spacers could be used in a two-stage join-up. A jig (not shown) may be utilised to support the shear web 16 during the first stage of the join up, allowing precise control over the thickness of the lower bond line 48. As shown in FIG. 13a, upper bond spacers 54b are provided on top of the upper mounting flange 30 of the shear web 16.

Figure 13B:
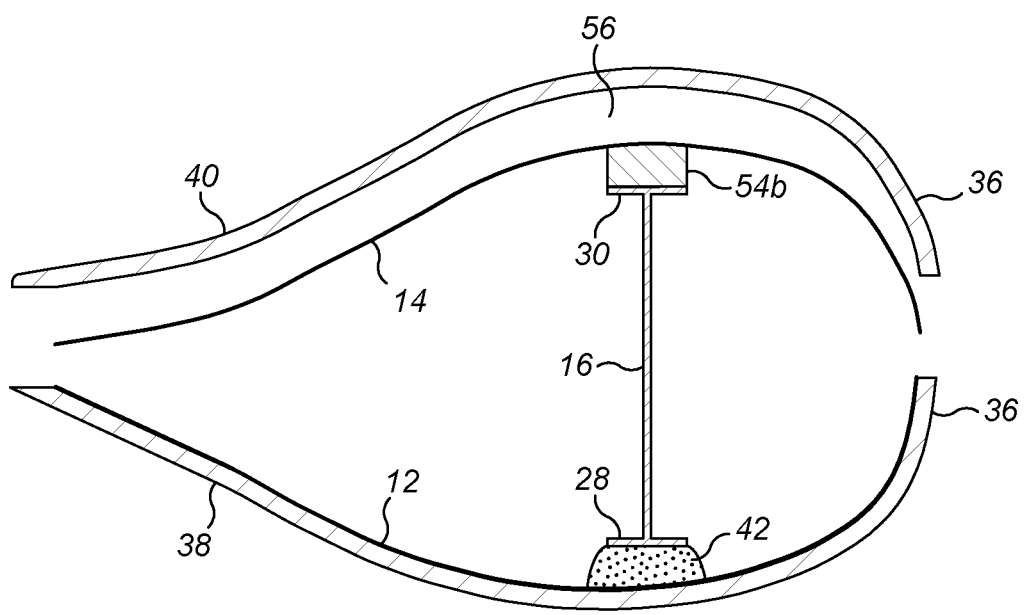

Referring to FIG. 13b, the mould assembly 36 is closed by lowering the upper mould half 40 onto the lower mould half 38. As shown in FIG. 13b, the upper half shell 14 releases from the upper half mould 38 and is supported by the upper bond spacers 54b. The mass of the upper half shell 14 is less than the yield strength of the upper bond spacers 54b, which therefore support the upper shell 14 without plastically deforming.

Figure 13C:
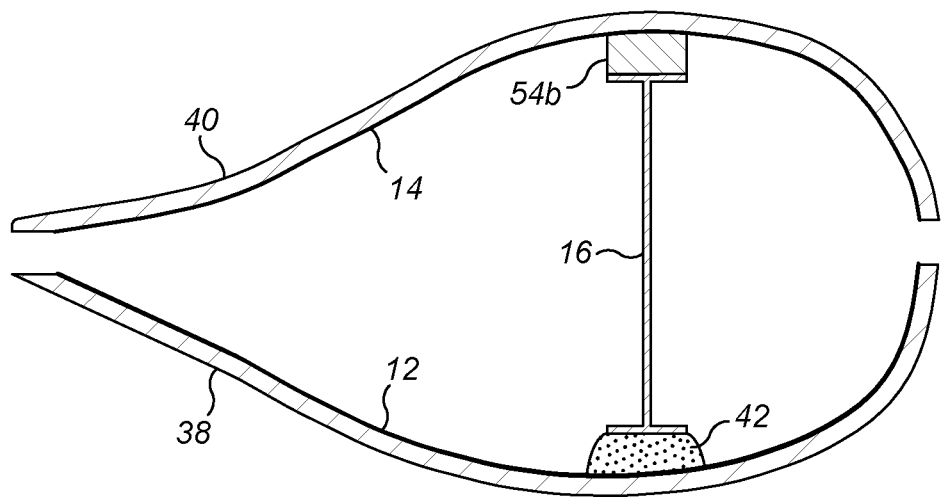

Referring to FIG. 13c, the upper mould half 40 is lowered further and makes contact again with the upper half shell 14. As with the previous example, the upper bond spacers 54b force the upper half shell 14 back into the upper mould half 40 before substantial compression of the adhesive 42, 44 takes place (the adhesive 44 on the upper mounting flange 30 can be seen for example in FIG. 6). The mass of the upper mould half 40 now also acts on the bond spacers 54b. The combined load of the upper mould half 40 and the upper half shell 14 acting on the bond spacers 54b exceeds the yield strength of the bond spacers 54b. The bond spacers 54b therefore begin to undergo plastic deformation. As the bond spacers 54b push the upper shell 14 firmly into its mould half 40, the adhesive 44 (shown in FIG. 6) is compressed evenly along the length of the shear web 16.

Figure 13D:
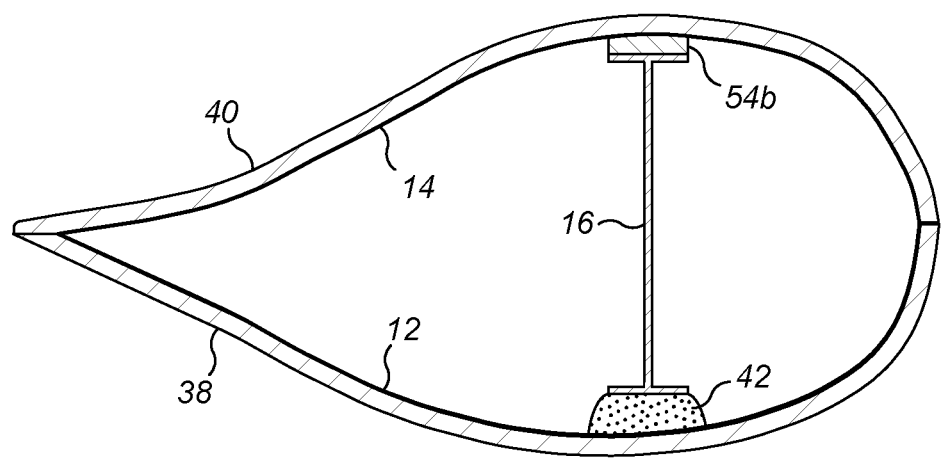

Referring to FIG. 13d, the upper mould half 40 is lowered further to bring the first and second half shells 12, 14 together. The bond spacers 54b continue to compress until end stops on the mould are reached. As the upper half shell 14 is pushed firmly into the upper mould half 40, even compression of adhesive 44 (shown in FIG. 6) in the upper bond line 50 (also shown in FIG. 6) is ensured along the length of the shear web 16. Heat may now be applied to cure the adhesive 44. With the upper half shell 14 pushed firmly into the upper mould half 40, the upper half shell 14 is prevented from lifting and causing a dis-bond during the curing process.

The use of bond spacers 54b therefore also presents a number of advantages when used in a two-stage join up. In summary, the bond spacers 54b ensure that the second half shell 14 is pushed firmly into the second half mould 40 before substantial compression of the adhesive 44 takes place. This avoids gaps between the shell 14 and mould 40 during the cure process, and thus prevents the possibility of the upper half shell 14 lifting and causing a dis-bond. More generally, the bond spacers 54b serve to prevent movement between the shell 14 and the web 16 during the bonding process. With the second half shell 14 firmly seated in its mould 40, even compression of the adhesive 44 is achieved along the length of the shear web 16. This avoids over compression of adhesive 44, which could also cause dis-bonds.

The bond spacers 54, 54a, 54b described above have material properties such that when they are compressed under sufficient load, they maintain their deformed shape (i.e. they undergo plastic deformation). If the spacers 54, 54a, 54b did not maintain their compressed shape (e.g. if they only underwent elastic deformation) then they may act as springs between the web 16 and the shells 12, 14 and could push the web flange away from the shell 12, 14 and cause dis-bonds in the adhesive 42, 44. The use of bond spacers 54, 54a, 54b which undergo plastic deformation therefore avoids the possibility of the spacer blocks 54, 54a, 54b themselves causing dis-bonds in the bond lines 48, 50 between the shear web 16 and the half shells 12, 14. The bond spacers 54, 54a, 54b are also relatively lightweight and therefore do not add appreciable weight to the blade 10.

As noted above, a plurality of bond spacers 54 are used along the length of the shear web 16, on the upper and lower sides. When the above description refers to the mass of the upper mould half 40 and upper half shell 14 exceeding the yield strength of the bond spacers 54a, 54b, it should be appreciated that that the mass of the mould half 40 will be distributed among the plurality of bond spacers 54a, 54b.

The compression modulus and the yield strength of the material of the bond spacers 54a, 54b are carefully chosen. If the material is too stiff (a high compression modulus) then the bond spacers 54a, 54b would not sufficiently compress and may cause damage to the web flanges 28, 30 and/or the half shells 12, 14 or even the mould halves 38, 40. For example, if the bond spacer material has a high compressive modulus the bond spacer 54a, 54b would not be compressed when the upper half shell 14 and upper mould half 40 bear against the bond spacer 54a, 54b. This could cause the web 16 to buckle, or the shells 12, 14 to be damaged, or the mould half 38, 40 to be damaged.

The number of upper bond spacers 54b that are used is linked to the stiffness of the upper half shell 14 and the weight of the upper half shell 14. The upper half shell 14 will tend to hang (i.e. sag) between the bond spacers 54b, that is it will adopt a wave-like shape in a spanwise direction S (shown in FIG. 1). Therefore, a second half shell 14 having a relatively low stiffness will require bond spacers 54b at closer intervals than a second half shell 14 having a relatively high stiffness. The number of upper bond spacers 54b that are used is also linked to the maximum allowable size of the spacers 54b because the spacers 54b cannot be so large that they would have a negative impact on the bond line 50, and the maximum allowable point load on the upper mould half 40.

In an example, from the stiffness of the upper blade shell 14 it is determined that bond spacers 54b should be placed at intervals of three meters. A bond spacer 54b will then be subjected to the weight of the upper shell half 14 and the upper mould half 40 for 1.5 meters each side of the bond spacer 54b. Therefore, the bond spacer 54b will be subjected to the weight of a three-meter length of the upper half shell 14 and upper mould half 40. If the weight of this three-meter length of upper half shell 14 and upper mould half 40 is 1500N (by way of example only) then the material and the dimensions of the bond spacer 54b are selected such that the compressive yield strength of the bond spacer is 1500N or less. In addition, the compressive failure strength of the bond spacer 54b must be greater than 1500N.

These same principles apply when selecting the number, spacing and materials for the first (lower) bond spacers 54a. Preferably the first bond spacers 54a are identical to the second bond spacers 54b.

Many modifications may be made to the above examples without departing from the scope of the present invention. For example, the adhesive 42 could alternatively be applied directly to the lower mounting flange 28 of the shear web 16 instead of to the first half shell 12. The 'lower' bond spacers 54a may alternatively or additionally be applied to the lower mounting flange 28, in a similar way to that described above in relation to the upper mounting flange 30. Also, in other embodiments, the adhesive 44 could be applied to the inner surface 34 of the second half shell 14 instead of to the upper mounting flange 30 of the shear web 16. The 'upper' bond spacers 54b may alternatively or additionally be applied to the inner surface 34 of the second half shell 14, in a similar way to that described above in relation to the adhesive 42 applied to the first half shell 12.

The terms 'upper' and 'lower' are used for convenience in the above description to refer to the various parts in the orientations shown in the figures. These terms are not intended to limit the scope of the invention.

The invention claimed is:

1. A method of making a wind turbine blade having an outer shell formed of first and second half shells, the method comprising:
   providing a first half shell supported by a first mould half;
   providing a second half shell supported by a second mould half;
   providing a shear web having a web panel disposed between first and second longitudinally-extending mounting flanges;
   providing adhesive between the first mounting flange and an inner surface of the first half shell to form a first bond line;
   providing adhesive between the second mounting flange and an inner surface of the second half shell to form a second bond line;
   providing one or more bond spacers between the second mounting flange and the inner surface of the second half shell;
   arranging the second mould half and the second half shell respectively on top of the first mould half and the first half shell to join the first and second half shells together,
   wherein the weight of the second half shell and the second mould half acts on the shear web and causes compression of the adhesive in the second bond line and plastic deformation of the one or more bond spacers.

2. The method of claim 1, comprising arranging one or more further bond spacers between the first mounting flange and the inner surface of the first half shell.

3. The method of claim 2, wherein the weight of the second half shell and the second mould half acting on the shear web causes compression of the adhesive in the first bond line and plastic deformation of the one or more further bond spacers.

4. The method of claim 1, comprising forming the first and second bond lines simultaneously and at the same time as joining the first and second half shells together.

5. The method of claim 1, comprising curing the adhesive in the first and second bond lines simultaneously.

6. The method of claim 1, wherein the method comprises arranging a first plurality of bond spacers between the first mounting flange and the first half shell, and wherein providing the one or more bond spacers between the second mounting flange and the second half shell comprises arranging a second plurality of bond spacers between the second mounting flange and the second half shell.

7. The method of claim 6, comprising simultaneously compressing the first and second plurality of bond spacers to substantially equal extents such that the first and second bond lines are of substantially equal thickness.

8. The method of claim 1, comprising forming the first bond line prior to forming the second bond line and prior to joining the first and second half shells together.

9. The method of claim 1, comprising curing the adhesive in the first bond line prior to arranging the second mould half and the second half shell on top of the first mould half and the first half shell.

10. A wind turbine blade comprising:
    an outer shell formed of first and second half shells joined together;
    a shear web arranged inside the outer shell, the shear web having a web panel disposed between first and second longitudinally-extending mounting flanges;
    a first adhesive bond line between the first mounting flange and an inner surface of the first half shell;
    a second adhesive bond line between the second mounting flange and an inner surface of the second half shell; and
    one or more plastically deformed bond spacers located in the second bond line.

11. The wind turbine blade of claim 10, further comprising one or more further plastically deformed bond spacers located in the first bond line.

12. The wind turbine blade of claim 11, wherein each of the one or more further bond spacers comprises a block of foam.

13. The wind turbine blade of claim 11, wherein the one or more further plastically deformed bond spacers comprises a plurality of further plastically deformed bond spacers arranged at spaced intervals along the first bond line.

14. The wind turbine blade of claim 11, wherein the one or more further plastically deformed bond spacers are compressed between the first mounting flange and the inner surface of the first half shell.

15. The wind turbine blade of claim 10, wherein each of the one or more bond spacers comprises a block of foam.

16. The wind turbine blade of claim 10, wherein the one or more plastically deformed bond spacers comprises a plurality of plastically deformed bond spacers arranged at spaced intervals along the second bond line.

17. The wind turbine blade of claim 10, wherein the one or more plastically deformed bond spacers are compressed between the second mounting flange and the inner surface of the second half shell.

18. The wind turbine blade of claim 11, wherein the one or more further bond spacers comprises a first plurality of bond spacers provided in the first bond line, wherein the one or more bond spacers comprises a second plurality of bond spacers provided in the second bond line, and wherein the first and second plurality of bond spacers are compressed to substantially equal extents such that the thickness of the first and second bond lines is substantially equal.

* * * * *